March 3, 1936.       R. B. CALCUTT       2,032,683

WEATHER STRIP

Filed Jan. 10, 1935        2 Sheets-Sheet 1

Inventor:
REGINALD B. CALCUTT.
By E. N. Lundy
Atty.

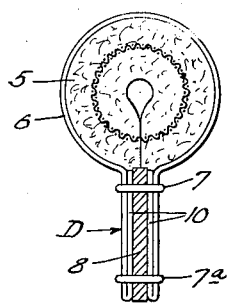
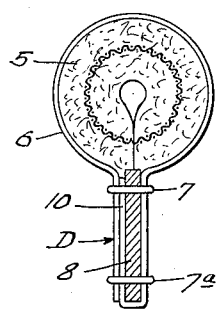
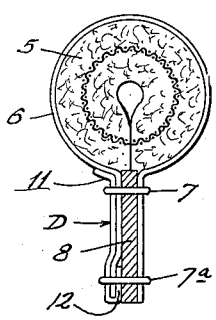
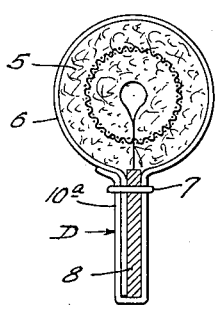
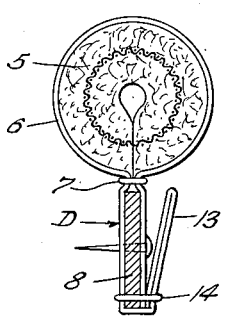
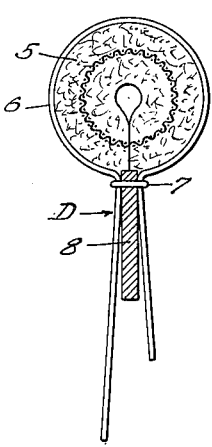
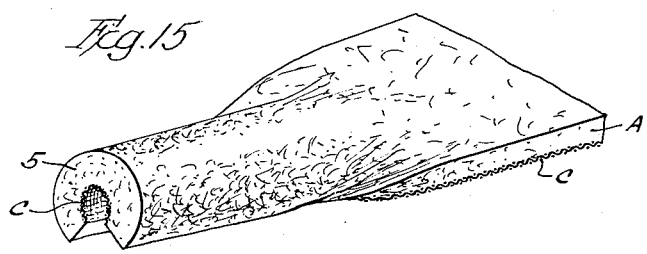
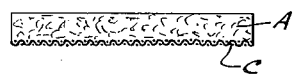
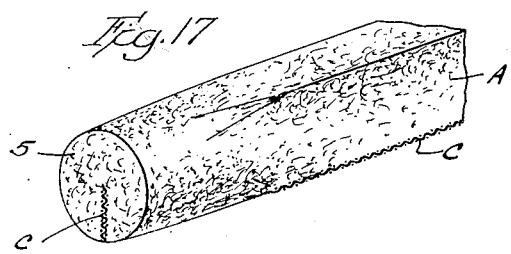

Patented Mar. 3, 1936

2,032,683

UNITED STATES PATENT OFFICE 2,032,683

WEATHER STRIP

Reginald B. Calcutt, Chicago, Ill.

Application January 10, 1935, Serial No. 1,187

20 Claims. (Cl. 20—69)

My present invention relates to weather-strips or gaskets for sealing the space or crevice between two cooperating closed members, such as doors, windows and other structures, to render said space air-tight.

The article which I have devised embodies a packing or cushion enveloped in a waterproof covering, the fabric providing said covering being folded to form an attaching fin or flange made of a plurality of plies and preferably stiffened by a sheet of material that gives the flange more rigidity than is secured by the plies of material alone. In this connection I prefer to use a strip animal-hair felt for the packing or cushion, such strip being initially of a rectangular or square cross-section and squeezed together in the process of manufacture of the weather-strip to a normally substantially cylindrical cross-section. The felt strip may be several superimposed plies with strengthening fabric, rubber strip or the like between the plies, or the strengthening element may be on one surface of a single ply, or may be omitted entirely. By compressing or squeezing the rectangular felt into cylindrical cross-section and retaining it in such shape for use I provide a cushion that is inherently more expansive and more capable of returning to normal shape when in use. The reinforcing member in the fin is a strip or strips of relatively thin builder's paper or the like.

Felt of the above description and the builder's paper are very cheap materials, readily obtainable in the market and they are quite effective when utilized in a weather-strip in the manner herein described. Thus I am able to materially reduce the manufacturing cost of the weather-strip with the proportionate saving to the user of the article.

The weather-strip above suggested is capable of being assembled in a variety of forms and is well-adapted for production in continuous 100-foot to 500-foot lengths that is wound upon spools or reels for retail sale. The character and disposition of the elements of the weather-strip renders it possible to assemble it by a single operation on a sewing or stitching-machine.

Among the objects of my invention may be mentioned the provision of a weather-strip that is novel in construction; is effective and dependable in performing its functions; is economical to manufacture; and is easy to attach. Other objects and advantages will be obvious to persons skilled in the art after my invention is better understood from the following description.

Reference is made to the accompanying drawings for a detailed disclosure of the construction and assembly of the parts of my improved weather-strip, and in said drawings:—

Figures 9, 10, 11 and 12 are transverse sections showing modified constructions of the attaching fin or flange.

Figures 13 and 14 are transverse sections showing the types of fins or flanges that are utilized on refrigerator doors and the like.

Figures 15 and 16 are views similar to Figures 2 and 3 showing modified forms of the felt cushion.

Figures 17 and 18 are end views of the felt strips shown respectively in Figures 15 and 16 before they are squeezed into cylindrical section.

Figure 1:
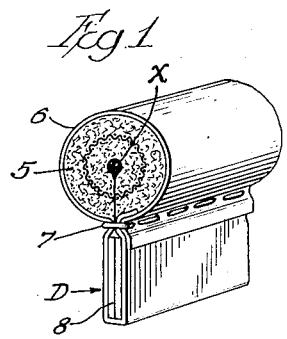
Figure 1 is a perspective of an end portion of a length of weather-strip made in accordance with the principles of my present invention.

I prefer to accomplish the numerous objects of my invention and to practice the same in substantially the manner hereinafter described and as particularly pointed out in the claims. The drawings are schematic and illustrate several typical or preferred forms in which my invention may be produced. In the following description the same parts are identified by the same reference characters in all the views where such parts appear.

The cushion or packing is preferably an animal-hair felt that is a cheap grade of felt but which has inherent characteristics that render it well adapted for use where a yielding cushioning action is desired. This felt may be used in thin bands of two plies A and B with a third ply C which may be woven fabric such as cotton gauze or burlap, or a strip of rubber, or a rubberized sheet. The sheet C is preferably adhered to the felt by a suitable cement or sizing as may be desired.

Figure 2:
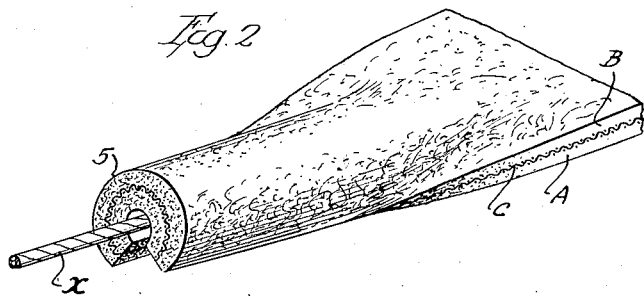
Figure 2 is a view in perspective of a length of gasket or cushion showing the use of a relatively thin wide strip of felt and the manner of shaping the same into cylindrical form.
Figure 3:
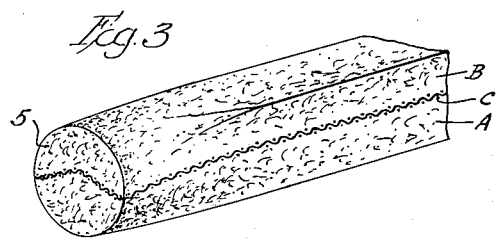
Figure 3 is a view similar to Figure 2, showing the use of a length of felt that is substantially square in cross-section.
Figure 4:
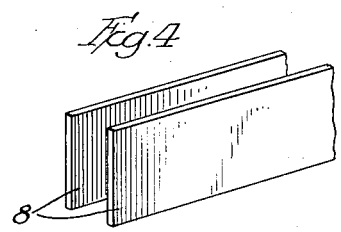
Figure 4 is a perspective view showing the reinforcing material.

Obviously the sheet C may be omitted. Instead of a thin band, the felt may be thicker and narrower so that it is substantially square in cross-section as illustrated in Figure 3 and the ply C may be omitted therefrom if desired. A cushion 5 of cylindrical cross-section is desirable in many types of weather-strip, such as shown in most of the sectional views of the drawings, and in order to secure this cross-section formation the band of felt of either the flat-section shown in Figure 2 or the square-section shown in Figure 3, is squeezed together as suggested at the near ends of the parts as graphically shown in these two views.

In order to maintain the cushion in cylindrical sectional shape it is enveloped in a suitable cover 6 that is held in position by a longitudinal row of stitches 7. It is preferred to employ a waterproof closely woven fabric for the covering 6, such fabric being cut in long relatively narrow widths, with its cushion-encircling portion intermediate its longitudinal edges.

The attaching fin or flange of the weather-strip is formed with the portions of the fabric disposed beyond the stitches by folding together at least two plies of the fabric as shown in Figures 1, 5, 6 and 7, or three or four plies may be employed as shown in Figures 9 to 12. The fin or flange is designated in all the above mentioned views by reference character D and is disposed radial to the cushion. In Figure 1 the longitudinal edges of the covering fabric are overlapped at the location of the row of stitches 7, so that said stitches pass through said overlapped portions and thus provide a pocket within the fin or flange D for the reception of reinforcement in the form of one or more strips of builder's paper 8 or other suitable material. In some cases the strip 8 may be omitted from the fin or flange as has been suggested in Figure 8.

Figure 5:
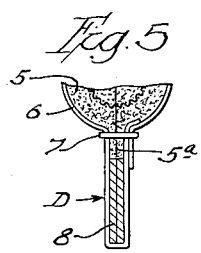
Figures 5, 6 and 7 are transverse sections illustrating several modified arrangements of the covering material and stitching.

As above described, the stitches 7 pass through the overlapped portions of the covering fabric in a plane between the cushion 5 and the reinforcement 8. It, of course, is feasible to modify this arrangement by having the stitches pass through a portion 5ª of the cushion material that has been pressed into the adjacent portion of the pocket forming the fin or flange, as shown in Figure 5.

Figure 6:
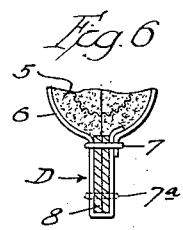

Another modification consists in locating the stitches so that they pass through the reinforcement as shown in Figure 6 wherein an additional row of stitching 7ª is shown located towards the outer edge of the fin or flange.

Figure 7:
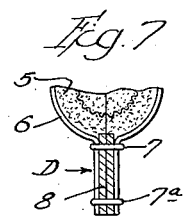

Figure 7 shows two spaced rows of stitches 7, 7ª passed through the covering and reinforcement but in this construction the covering fabric is not overlapped and terminates at the outer edge of the reinforcement so that said outer edge is uncovered or exposed in order to effect a saving in material. It will be noted that the reinforcement strip 8 in this view extends into the adjacent portion of the cushion a short distance.

In Figure 9 the two longitudinal edges of the covering fabric are folded back each upon itself with the respective folded-back portions 10 disposed to face each other and form the multiple-ply fin or flange, and the sheet of reinforcing material 8 is interposed between said folded-back portions 10 to stiffen the fin or flange. There are preferably two rows of stitches 7, 7ª, and at least one of these rows may pass through the reinforcement 8.

In Figure 10 only one edge of the covering fabric has a folded-back portion 10 and the reinforcing material 8 may be disposed between these two plies. In this arrangement the other edge of the fabric lies flat against the outer surface of the folded-back portion 10. The several plies of the fin or flange are secured together by rows of stitches 7, 7ª, located at different distances from the free edge of the fin or flange.

The outer edges of the covering fabric in Figure 11 terminate at the free edge of the fin or flange similar to the arrangement shown in Figure 7 and there is a separate strip 11 of the waterproof fabric superimposed upon the face of the fin that is outermost or exposed in use. This separate strip 11 is wider than the fin so that its outer edge 12 may be lapped under the outer edge of the adjacent portion of the covering fabric and inserted up between the adjacent ply and the reinforcing strip 8, the several parts being held together by stitches 7, 7ª.

Figure 12 illustrates a fin or flange constructed with the covering fabric arranged somewhat similar to Figure 10 excepting that the folded back portion 10ª of the fabric is disposed on the outside face of the other edge of the fabric and extends along the fin or flange, and a single row of stitches 7 is placed near the inner edge of the fin to maintain the parts in proper assembly.

A weather-strip of what is generally known as the refrigerator-door type is exemplified in Figure 13. The covering fabric encompasses the packing or cushion 5 with a narrow edge portion forming one of the plies of the fin or flange extends along one side of the reinforcing strip 8 while the other edge portion which is wider than the first mentioned edge portion extends along the other side of strip 8 and then passes across the outer bottom edge of the latter.

A tack-concealing flap 13 is then made by an overfolding of the remainder of the wide edge portion of the fabric. A row of stitches 14 passes through the plies forming the fin and the concealing flap and draws the latter towards the fin. It will be understood the reinforcing member 8 may be inserted in the flap 13 instead of in the fin or flange, and there is a row of stitches 7 at the inner edge of the fin that maintains the cushion material in its normal cylindrical shape.

Another refrigerator type of weather-strip is disclosed in Figure 14, wherein a single row of stitches 7 unites the fabric covering to the reinforcing strip 8 and maintains the cushion in cylindrical shape, while the edge portions of the fabric hang free and unsecured from the stitches to their outer edges.

In any or all of the types or structures above described it may be found expedient to incorporate a continuous piece x of cord.

Figure 8:
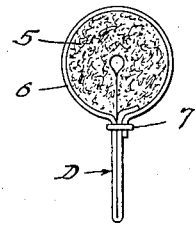
Figure 8 is a transverse section of a structure similar to Figure 1 with the fin or flange reinforcement omitted.

Obviously, the cushion may be any of the well-known felts made of such materials as cattle-hair, goat-hair, wool, or cotton, or even rubber sponge, rubber tubing or the like, may be used. However, I have ascertained and prefer to use a cattle-hair felt that is cut in continuous strips or bands approximately ¾ inch to 1 inch wide and ⅛ inch to ¼ inch thick, or the strips may be of less width and thicker so that they are substantially square in cross-section. The cushion may be made from a plurality of superimposed plies of felt initially rectangular in cross section and either with or without the stiffening material interposed between them. A felt strip without the stiffening material is shown in Fig. 8. This preferred material is very cheap; it readily lends itself to the purpose desired in that it is inherently capable of being squeezed into the proper cylindrical shape; and when it is compressed in use will readily expand to the desired cross-sectional shape upon releasing the pressure. Hence, a weather-strip employing cattle-hair felt as a cushion is considerably less expensive to manufacture so that it may be placed on the market at a price much below that of weather-strips employing other and more expensive cushion material.

In the production of this weather-strip the continuous lengths of the component elements are fed through a sewing or stitching machine having a folding attachment through which the materials are fed effecting an assembly that is made in a single operation.

What I claim is:

1. A weather-strip comprising a cushion consisting of an initially flat strip of yieldable material that is shaped during assembly into substantially cylindrical cross-section with the marginal edges of the strip abutting and a loose cord forming a core about which said cushion is shaped, a flexible cover enclosing said cushion and maintaining said cushion normally in cylindrical cross-section, an attaching flange formed with the edges of the cover material and disposed lateral to the cushion, and a stiffening strip coacting with said flange and disposed in edgewise alinement with the core of said cushion.

2. A weather-strip comprising a cushion consisting of an initially flat strip of yieldable material that is shaped during assembly into substantially cylindrical cross-section with the marginal edges of the strip abutting and a loose cord forming a core about which said cushion is shaped, a flexible cover enclosing said cushion and maintaining said cushion normally in cylindrical cross-section, an attaching flange formed with the edges of the cover material and disposed lateral to the cushion, and a stiffening strip associated with said flange and so disposed with respect to said cushion that a portion of the yieldable material of the cushion when the weather-strip is in use is compressed between the adjacent edge of the stiffening strip and the core of the cushion.

3. A weather-strip comprising a cushion consisting of a strip of yieldable material shaped substantially cylindrical in cross-section with the marginal edges abutting and a loose cord providing a core therefor, a flexible cover enveloping said cushion and maintaining the same in shape, a hollow attaching flange disposed lateral to said cushion, and a stiffening strip enclosed within said flange and disposed in edgewise alinement with the core of said cushion.

4. A weather-strip comprising a cushion consisting of a strip of yieldable material shaped substantially cylindrical in cross-section with the marginal edges abutting and a loose cord providing a core therefor, a flexible cover enveloping said cushion and maintaining the same in shape, a hollow attaching flange disposed lateral to said cushion, and a stiffening strip enclosed within said flange and so disposed with respect to said cushion that a portion of the yieldable material of the cushion when the weather-strip is in use is compressed between the adjacent edge of the stiffening strip and the core of the cushion.

5. A weather-strip comprising a cushion consisting of a strip of yieldable material shaped substantially cylindrical in cross-section with the marginal edges abutting and a loose cord providing a core therefor, a flexible cover enveloping said cushion, an attaching flange formed with the marginal portions of the cover material, and a stiffening strip coacting with said flange, the arrangement of the parts of the above described structure being such that when the cushion abuts an element opposing the member to which the weather-strip is attached a portion of the yieldable material of the cushion is compressed between the adjacent edge of the stiffening strip and the core of the cushion.

6. A weather-strip comprising a cushion consisting of a strip of yieldable material shaped substantially cylindrical in cross-section with the marginal edges abutting and a loose cord providing a core therefor, a flexible cover enveloping said cushion, a hollow attaching flange formed with the marginal portions of the cover material, and a stiffening strip disposed within said flange, the arrangement of the parts of the above described structure being such that when the cushion abuts an element opposing the member to which the weather-strip is attached a portion of the yieldable material of the cushion is compressed between the adjacent edge of the stiffening strip and the core of the cushion.

7. A weather-strip comprising a cushion consisting of an initially flat strip of yieldable material that is shaped during assembly into substantially cylindrical cross-section with the marginal edges of the strip abutting and a loose cord forming a core about which said cushion is shaped, a flexible cover enclosing said cushion and maintaining said cushion normally in cylindrical cross-section, an attaching flange formed with the edges of the cover material and disposed lateral to the cushion, a stiffening strip coacting with said flange and disposed in edgewise alinement with the core of said cushion, and means passing through the structure at the juncture of the cushion and flange for maintaining the parts in assembly.

8. A weather-strip comprising a cushion consisting of a strip of yieldable material shaped substantially cylindrical in cross-section with the marginal edges abutting and a loose cord providing a core therefor, a flexible cover enveloping said cushion and maintaining the same in shape, a hollow attaching flange disposed lateral to said cushion, a stiffening strip enclosed within said flange and disposed in edgewise alinement with the core of said cushion, and means passing through the structure at the juncture of the cushion and flange for maintaining the parts in assembly.

9. A weather-strip comprising a cushion consisting of a strip of yieldable material shaped substantially cylindrical in cross-section with the marginal edges abutting and a loose cord providing a core therefor, a flexible cover enveloping said cushion, an attaching flange formed with the marginal portions of the cover material, a stiffening strip coacting with said flange, and means passing through the structure at the juncture of the cushion and flange for maintaining the parts in assembly, the arrangement of the parts of the above described structure being such that when the cushion abuts an element opposing the member to which the weather-strip is attached a portion of the yieldable material of the cushion is compressed between the adjacent edge of the stiffening strip and the core of the cushion.

10. A weather-strip comprising a cushion consisting of an initially flat strip of yieldable material that is shaped during assembly into substantially cylindrical cross-section with the marginal edges of the strip abutting, a flexible cover enclosing said cushion and maintaining said cushion normally in cylindrical cross-section, an attaching flange formed with the edges of the cover material and disposed lateral to the cushion, and a stiffening strip coacting with said flange and disposed in edgewise alinement with the axis of said cushion.

11. A weather-strip comprising a cushion consisting of an initially flat strip of yieldable material that is shaped during assembly into substantially cylindrical cross-section with the marginal edges of the strip abutting and a reinforcing strip engaging and shaped with said yieldable material, a flexible cover enclosing said cushion and maintaining said cushion normally in cylindrical cross-section, an attaching flange formed with the edges of the cover material and disposed lateral to the cushion, and a stiffening strip coacting with said flange and disposed in edgewise alinement with the axis of said cushion.

12. A weather-strip comprising a cushion consisting of two initially flat strips of yieldable material and an intermediate reinforcing strip, all of said strips shaped into substantially cylindrical cross-section with their marginal edges abutting, a flexible cover enclosing said cushion and maintaining the component strips thereof in normally cylindrical cross-section, and a multiple-ply attaching flange extending lateral from said cushion in edgewise alinement with the axis of said cushion.

13. A weather-strip comprising a cushion consisting of an initially flat strip of yieldable material that is shaped during assembly into substantially cylindrical cross-section with the marginal edges of the strip abutting and contacting each other, a loose cord providing a core about which said cushion is shaped, a flexible cover enclosing said cushion and maintaining said cushion normally in cylindrical cross-section, and an attaching flange formed by the marginal portions of the cover material and disposed lateral to the cushion in edgewise alinement with the core of said cushion.

14. A weather-strip comprising a cushion consisting of superimposed plies of yieldable material and a reinforcing ply, said cushion having an initially rectangular cross-section that is shaped into substantially cylindrical cross-section, a flexible cover enveloping said cushion and maintaining the latter in normally cylindrical cross-section, and a multiple-ply flange extending laterally from said cushion in substantially edgewise alinement with the axis of said cushion.

15. A weather-strip comprising a cushion consisting of two initially flat strips of yieldable material and an intermediate reinforcing strip, all of said strips shaped into substantially cylindrical cross-section with their edges abutting and contacting each other, a loose cord providing a core about which said cushion is shaped, a flexible cover enclosing said cushion and maintaining said cushion normally in cylindrical cross-section, and an attaching flange formed by the marginal portions of the cover material and disposed lateral to the cushion in edgewise alinement with the core of said cushion.

16. A weather-strip comprising a cushion consisting of an initially flat strip of yieldable material and a reinforcing strip, all of said strips shaped into substantially cylindrical cross-section with their edges abutting and contacting each other, a loose cord providing a core about which said cushion is shaped, a flexible cover enclosing said cushion and maintaining said cushion normally in cylindrical cross-section, and an attaching flange formed by the marginal portions of the cover material and disposed lateral to the cushion in edgewise alinement with the core of said cushion.

17. A weather-strip comprising a hollow cushion consisting of an initially flat strip of soft pliable material that is shaped during assembly into substantially cylindrical cross-section with the marginal edges in contacting abutment to provide and maintain the cushion with a clearly defined axial bore, a flexible cover enclosing and maintaining said cushion normally in hollow cylindrical cross-section, and an attaching flange formed by marginal portions of the cover material, which flange is disposed lateral to the cushion in substantially edgewise alinement with the axial bore of said cushion.

18. A weather-strip comprising a hollow cushion consisting of an initially flat strip of soft pliable material that is shaped during assembly into substantially cylindrical cross-section with the marginal edges in contacting abutment to provide and maintain the cushion with a clearly defined axial bore, a flexible cover enclosing and maintaining said cushion normally in hollow cylindrical cross-section, and a multiple-ply attaching flange disposed lateral to the cushion in substantially edgewise alinement with the axial bore of said cushion.

19. A weather-strip comprising a cushion consisting of a strip of fibrous material initially rectangular in cross-section that is shaped into substantially round cross-section, a fabric cover enveloping said cushion and maintaining the fibrous material in normally round cross-section, and a multiple-ply attaching flange of fabric disposed lateral to the cushion in substantially edgewise relation to said cushion.

20. A weather-strip comprising a cushion consisting of a strip of fibrous material initially rectangular in cross-section that is shaped into substantially round cross-section and a reinforcing strip coacting with said fibrous material, a fabric cover enveloping said cushion and maintaining the fibrous material in normally round cross-section, and a multiple-ply attaching flange of fabric disposed lateral to the cushion in substantially edgewise relation to said cushion.

REGINALD B. CALCUTT.